May 14, 1940.  H. A. TRIPLETT  2,200,608
FUSE
Original Filed June 13, 1936  3 Sheets-Sheet 1
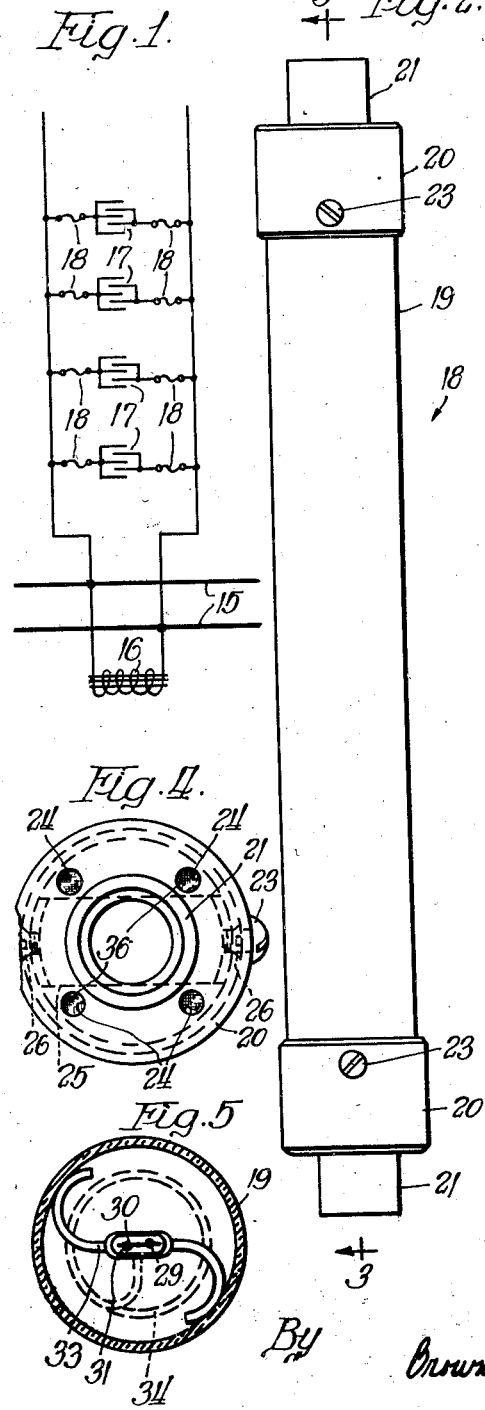
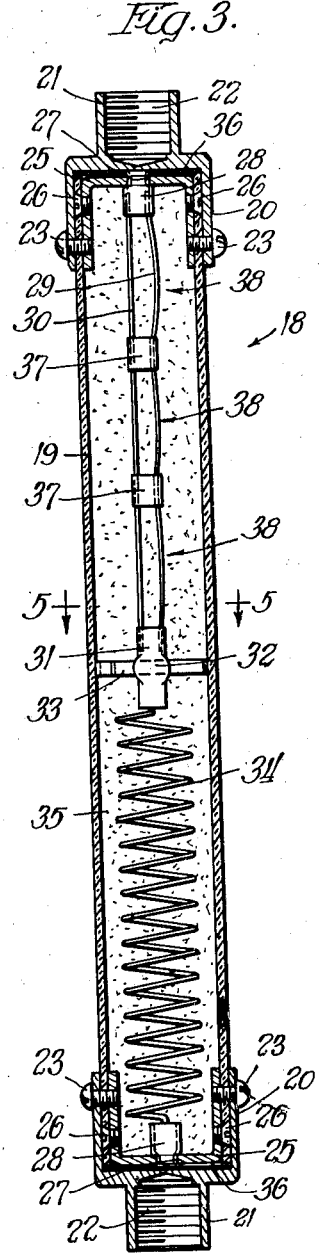
Inventor:
Hugh A. Triplett May 14, 1940.　　　H. A. TRIPLETT　　　2,200,608
FUSE
Original Filed June 13, 1936　　　3 Sheets-Sheet 2
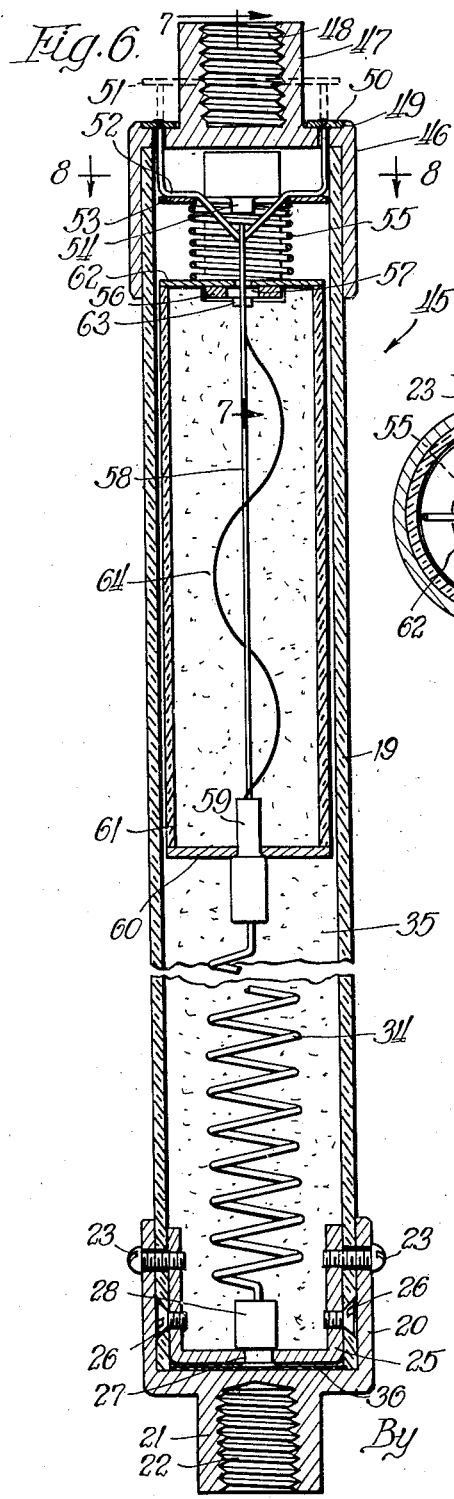
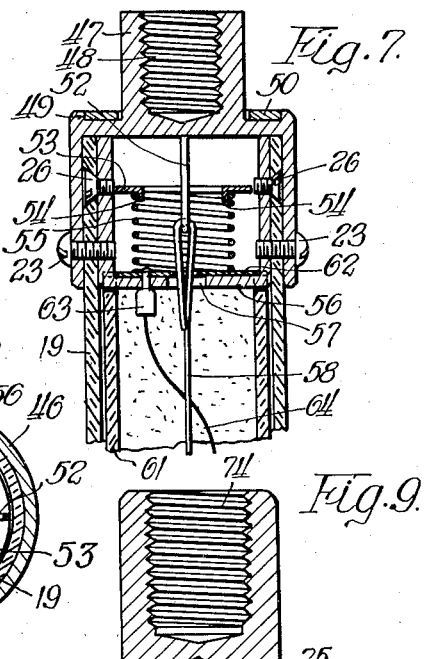
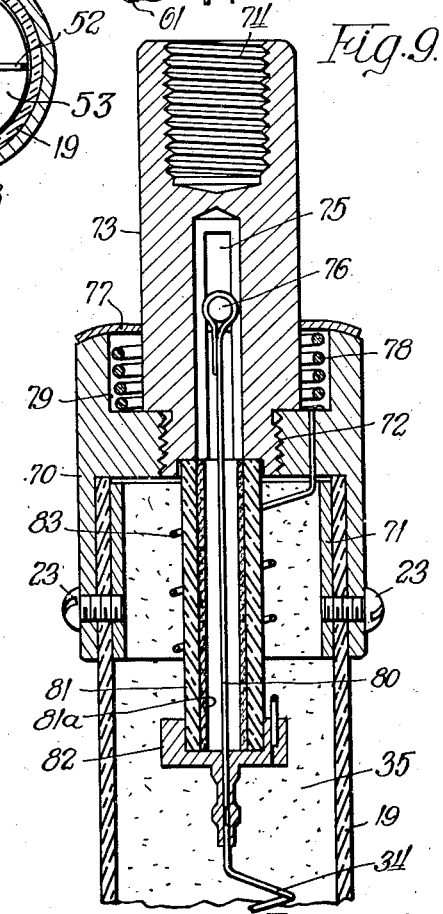
Inventor:
Hugh A. Triplett.
By Brown, Jackson, Boettcher & Dienner
Attys.

May 14, 1940. H. A. TRIPLETT 2,200,608
FUSE
Original Filed June 13, 1936 3 Sheets-Sheet 3
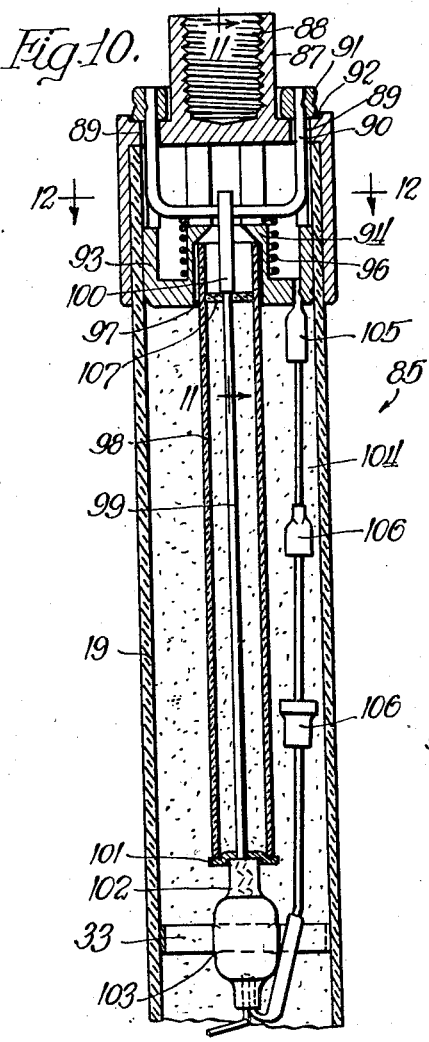
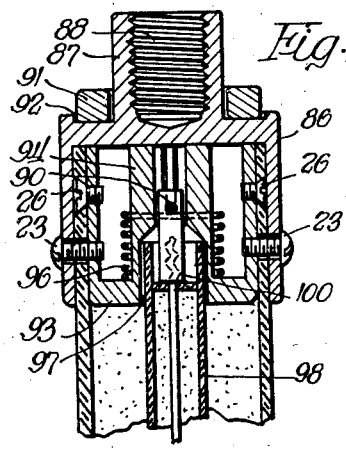
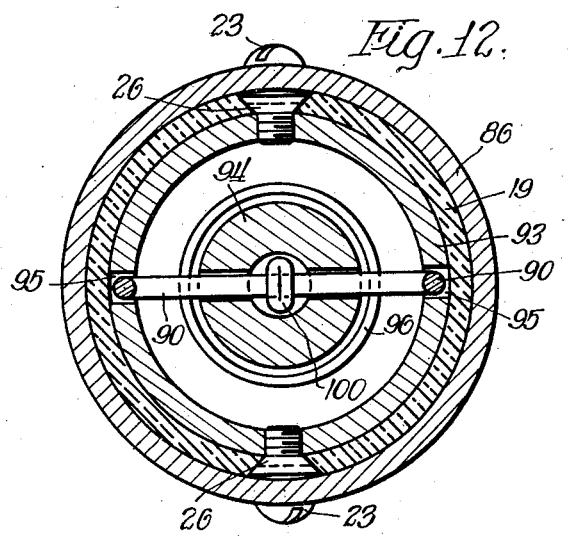
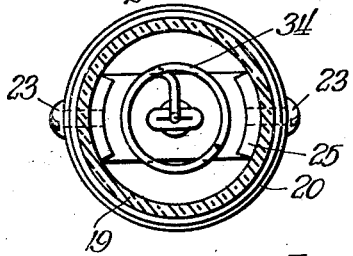
Inventor:
Hugh A. Triplett Patented May 14, 1940

2,200,608

UNITED STATES PATENT OFFICE 2,200,608

FUSE

Hugh A. Triplett, Wilmette, Ill., assignor to Schweitzer & Conrad, Inc., Chicago, Ill., a corporation of Delaware Application June 13, 1936, Serial No. 85,015
Renewed April 13, 1939

75 Claims. (Cl. 200—117)

My invention relates generally to electric circuit control devices, and it has particular relation to fuses.

In many industrial applications of alternating current power, a considerable penalty is incurred if the type of load causes a power factor below a certain specified value. This type of load cannot be avoided in many instances, and therefore steps are taken to correct it. One method for correcting for low power factor is to employ a capacitor bank for connection across the power circuit. The leading current drawn by the capacitor bank then compensates, to a corresponding degree, for the lagging current caused by the load, and the power factor of the system is improved in a proportionate amount.

The capacitor bank usually comprises a plurality of capacitors arranged to be connected in parallel circuit relation across the power circuit. Each capacitor should be separately fused so that in case of puncture of its dielectric, or failure from any other cause, the individual capacitors may be disconnected without requiring disconnection of other capacitors which are functioning properly. For such service, the rating of the fuse in amperes is usually low, but the voltage impressed on the capacitor bank is usually fairly high in order to provide compact and economical capacitors. The specific fuses herein shown by way of example are designed for a voltage of 2300 to 4000 volts, and are rated at five amperes capacity. These figures, it will be understood, are illustrative and not limiting, as the invention may be embodied in fuses for other uses and, in fact, the invention may be embodied in widely different forms, as will be apparent from the following description.

For a commercial installation, a relatively large number of separate capacitors in a bank is not unusual, and hence a relatively large number of fuses is required. It is important that the fuse for this service be both inexpensive and highly reliable. The primary object of the present invention is to furnish a fuse which will satisfy these requirements.

Since such installations are indoors, and necessarily in a confined space, and the fuses are near metallic structures, that is, both live conductors and grounded frames, casings, and the like, a fuse of the expulsion or blast type is not desirable. It is, therefore, a further object of the present invention to provide suitable fuses for these requirements which will not emit an arc or flame or ionized gases that might cause arcing to adjacent structures.

The preferred form of the present invention is a fuse of the cartridge type and is preferably powder filled, but this fuse differs radically in structure and in mode of operation from known fuses and secures a performance superior to known fuses of the cartridge type. The known types of cartridge fuses are not accurate as to time-current characteristics, and generally they are of relatively low energy-interrupting ability. Also, they are not well adapted for use with higher voltages because of the danger of failure to open the circuit completely, thereby allowing leakage and possibility of restriking of the arc after the fuse has operated.

It is a further object of the present invention to provide a fuse which is accurate as to its time-current characteristics, has high energy interrupting ability, is suitable for operation at high voltages, and is capable of interrupting the current flow completely and preventing leakage or restriking of the arc.

In high tension power practice, there are two general conditions which call for operation of the fuse. The first general condition of excessive current flow is that termed "overload". This may be an unduly high load through connected equipment, or it may be a high impedance or partial fault. Each of these conditions allows a current to flow, which current may be not much in excess of the normal current but which must not be allowed to continue to flow because of the danger of excessive heating resulting therefrom and progressive breakdown of connected conductors or apparatus. The second general condition is that of a low impedance fault which may result from a direct metallic connection between phases, or between a phase and ground, or which may result from the progressive destruction of insulation originating in a minor excess of current flow or leakage.

The present fuses are designed to operate satisfactorily and promptly under either condition of overload or low impedance fault, or at any intermediate condition. These fuses, in their preferred embodiments, comprise two functionally distinct elements, cooperating, however, in a novel and useful manner, as will be set forth hereinafter. The present fuse is a modification or special adaptation of the fuse disclosed in my copending application Serial No. 669,955, filed May 8, 1933, now Patent 2,066,129. Each of these two functionally distinct elements is capable of independent operation, in a suitable environment, for a service less than that required of the fuse of the present invention, and I aim to claim certain of the novel features of these elements separately.

The first element is the so-called current-sensitive element. It is sensitive to a function of current and time, according to predetermined characteristics. In the present structure, this element consists, preferably, of a silver fuse wire or similar high conductivity, non-corrosive, fusible metallic conductor which melts when traversed by a predetermined flow of current for a predetermined period of time, and results in the production of an arc or several arcs in series. Melting of this fuse element produces a break or breaks in the metallic circuit, which break or breaks are, during the maintenance of current flow, bridged by ionized gases and vapors constituting an arc. The medium which sustains this arc, if the current can be reduced to zero, will rapidly be deionized, condensed, or otherwise become non-conductive. This silver fuse wire may optionally be provided with a parallel support wire in one modification for use in assembly and handling, since the silver fuse element is incapable of withstanding much mechanical stress.

It is desirable to so construct the fuse wire as to cause a plurality of arcs to be formed at the time that the fuse wire melts, rather than to permit a single arc to be formed. Such construction permits advantage to be taken of the accumulative effect of a plurality of gaps in series, decreases the likelihood of flash-over when the fuse has operated, and effects a more uniform distribution of pressure within the fuse housing on operation thereof. In my copending application I have provided a spring for moving apart the terminal members between which the fuse wire is connected on melting thereof due to the occurrence of a fault. This operation assists in extinguishing the arc and preventing its being re-struck. In the present invention, no provision is made for moving the terminals of the fuse wire apart, since the arrangement and construction of the fuse element to provide a plurality of arcs in series perform substantially the same function. This is effected by placing one or more relatively massive conductor members in heat conducting relation with the fuse wire at one or more points intermediate its ends. For example, one or more metallic sleeves may be pinched onto the fuse wire so that the sections of the fuse wire therebetween and between the terminals will be melted to form a series of arcs between the terminals and the sleeve or sleeves.

The second element is a conductor such as tungsten, molybdenum, tantalum, or the like, of high melting point, embedded in a mass of powdered material such as limestone. When the conductor is heated to a high temperature, a reagent, such as oxygen, is evolved from the mass of normally inert material in which it is embedded, to produce a chemical reaction forming substantially a non-conductor, or, in other words, increases its resistance to a very high value.

In the preferred embodiments of my invention, these two elements are connected in series in a single cartridge. A current flow in excess of a predetermined value will produce one or more arcs which permit the introduction or formation of sufficient dielectric medium in the gaps as to prevent reestablishment of the arc after the current cyclically passes through zero. In the case of current flow of a substantially higher value, for example that caused by low impedance fault or short circuit conditions, the chemical fuse element also acts. The refractory conductor evolves from the chemical compound a reagent which reduces the conductor, without forming an arc, substantially to a non-conductor. Due to the marked increase in resistance of the conductor, the flow of current is reduced to such an extent that the arc is unable to sustain itself at the one or more points where the fusible conductor has been melted and gaps have been formed. This combination of elements is highly effective in preventing damage to connected apparatus by conditions which approach complete short-circuit. The operation is so rapid that no serious interference with the regulation of the line results from failure of the capacitor unit or as a result of any other fault which may have been established.

For the fuse having the rating as set forth above, namely 2300 to 4000 volts, five amperes, on a 60-cycle circuit, the possible short-circuit current might amount to approximately 20,000 r. m. s. amperes, but the effectiveness of the fuse is such that the current will not rise beyond a peak value of 800 amperes in this voltage range. The fuse, therefore, does not wait for the current zero to arrive to interrupt the circuit, but it is effective to stop the flow of current before the next zero point in the current wave arrives. This is a very important advantage.

A further object of the present invention is to improve the details of construction and the mode of operation of each of the aforesaid elements when used either conjointly or separately in devices of this character.

Since a fuse, which is constructed as set forth hereinbefore, operates on the occurrence of a fault without causing noise or without being destroyed from all outward appearances, an indicator is provided which is moved from one position to another on operation of the fuse. The preferred embodiment of my invention includes an indicator in the form of a ring which may be positioned at the base of one of the terminal members that is provided with a centrally located threaded boss for connection to the capacitor and to the line with which it is associated. The indicator ring is held inwardly against the biasing force of a spring by a strain wire which is connected in parallel with the fuse wire. On melting of the fuse wire, the strain wire is also melted and the spring is released. A periodic inspection by the operator will reveal which of the fuses has operated, and the necessary steps may then be taken to replace it.

Now, in order to acquaint those skilled in the art with the manner of constructing and operating a device embodying my invention, I shall describe, in connection with the accompanying drawings, different specific embodiments of the invention which it will be understood are merely illustrative and not limiting.

In the drawings:

Figure 1 is a diagram of connections of an industrial power factor corrective installation, in which fuses of my invention are advantageously employed;

Figure 2 is a view, in side elevation, of one embodiment of my invention;

Figure 3 is a longitudinal vertical section taken along the line 3—3 of Figure 2;

Figure 4 is a view, on a slightly enlarged scale, in top plan, of the fuse shown in Figures 2 and 3;

Figure 5 is a sectional view taken along the line 5—5 of Figure 3;

Figure 6 is a sectional view illustrating another embodiment of my invention, provided with an indicator;

Figure 7 is a sectional view taken along the line 7—7 of Figure 6;

Figure 8 is a sectional view taken along the line 8—8 of Figure 6;

Figure 9 is a sectional view illustrating another embodiment of the indicator for a fuse of the type herein described;

Figure 10 is a longitudinal sectional view of still another embodiment of my invention;

Figure 11 is a sectional view taken along the line 11—11 of Figure 10;

Figure 12 is a sectional view, on an enlarged scale, taken along the line 12—12 of Figure 10; and Figure 13 is a sectional view taken along the line 13—13 of Figure 10.

Referring now particularly to the circuit connections shown in Figure 1 of the drawings, it will be observed that the reference character 15 designates the conductors forming a power supply line for energizing a load which may be represented by an inductor 16. Since a load of this type causes a lagging power factor, capacitors 17 forming a capacitor bank are connected across the conductors 15 as illustrated. In the event that any one of the capacitors 17 should fail, it is desirable that it be removed from connection to the conductors 15 while the remaining capacitors 17 remain connected thereto. For this purpose, a circuit control device comprising a fuse 18 is provided on each side of each of the capacitors 17, as shown. If any one of the capacitors 17 becomes punctured or fails otherwise, the fuses 18 associated therewith will be effective to disconnect it from the power supply line. The fuse 18 should be capable not only of clearing a fault due to a sustained overload, but also it should be capable of opening the circuit in event that a short circuit occurs.

The fuse 18, shown generally in Figures 2 and 3 of the drawings, is capable of this type of operation. As there shown, the fuse 18 comprises a housing 19 which may be of fiber or of fiber paper impregnated with a synthetic or natural resin, for example "Bakelite", and rolled into the form of a tube or sleeve and properly hardened. At each end of the housing 19 a terminal 20 is provided having a centrally located boss 21 extending outwardly therefrom. The boss 21 is interiorly threaded, as at 22, for connection to the capacitor 17 at one end and for connection to a line conductor at the other end. Screws 23, extending through the housing 19, are provided for securing the terminal members 20 in position. It will be obvious that other types and forms of terminal members may be used without departing from the scope of my invention. As shown more clearly in Figure 4 of the drawings, openings 24 are provided in the flange of the terminal members 20 for the purpose of venting the interior of the housing 19.

At each end of the housing 19 a U-shaped bracket 25 is provided which may be formed of a brass strip, the inwardly turned ends of which are threaded for engagement with the screws 23. Screws 26 are provided for securing the bracket 25 at each end of the housing 19 as illustrated. Each bracket 25 is provided with a centrally located aperture 27 and a fitting 28 made of soft brass tubing, constructed like a hollow rivet, has its outer end passed through the aperture 27 and expanded or riveted over, as by spinning or other suitable means. The inner end of the upper fitting 28 is pinched flat on a fuse wire 29 and on a support wire 30.

The fuse wire 29 is preferably composed of silver having a suitable cross-sectional area to provide the required conductivity for carrying current of the order of, for example, five to ten amperes, depending upon the rating of the fuse. Since the fuse wire 29 when composed of silver is relatively weak from a mechanical standpoint, the support wire 30 is provided to protect the fuse wire 29 during the assembly process and while it is being handled. In the specific form shown, the support wire 30 is a nickel-chromium wire of relatively small diameter which may be secured on the open market under the trade name of "Nichrome".

The lower ends of the fuse and support wires 29 and 30 are clamped in the upper end of an intermediate terminal member 31 which comprises a fitting composed of soft brass having an aperture 32 through which an S-shaped spring spider 33 extends and upon which the central portion of the intermediate terminal member 31 is pinched. The construction of the intermediate terminal member 31 and its relationship to the S-shaped spring spider 33 is more clearly illustrated in Figure 5 of the drawings. The spring spider 33 is provided for locating the intermediate terminal member 31 at the desired location intermediate the ends of the housing 19, and since it resiliently bears against the inner wall thereof, it may be readily positioned as desired.

With a view to providing for automatically increasing the resistance of the conducting path through the fuse 18, a conductor 34 is provided in the form of a helical coil having one end embraced by the lower end of the intermediate terminal member 31 which is fastened thereon and its other end secured to the lower fitting 28, as illustrated. The conductor 34 is preferably formed of tungsten, molybdenum, tantalum, or a similar metal of a class which has a very high melting point and which, when raised to a high temperature approaching the melting point, will evolve from an otherwise stable compound a suitable reagent and combine therewith. In this case, the housing 19 is filled with a suitable powder 35 comprising a suitable form of calcium carbonate such as limestone or marble dust. The powder 35, which completely fills the housing 19, may be introduced into the interior thereof through the openings provided between the sides of the upper bracket 25, for example, and the inner wall of the housing 19. In order to prevent the powder 34 from escaping through the openings 24 in the terminal members 20, starched linen washers 36 are provided over the ends of the housing 19 between the terminal members 20 and the brackets 25.

As set forth hereinbefore, it is desirable to sectionalize the arc which is formed on the melting of the fuse and support wires 29 and 30. For this purpose, spacers 37 are provided at intermediate points along the fuse and support wires 29 and 30 as illustrated. The spacers 37 are formed preferably of short lengths of brass tubing which may be pinched onto the fuse and support wires 29 and 30 to provide a heat conductive connection therewith. The spacers 37 divide the fuse and support wires 29 and 30 into sections 38. Due to the fact that the spacers 37 are relatively massive in construction as compared to the fuse and support wires 29 and 30, three arcs will be formed at the sections 38 between the spacers 37 and the upper fitting 28 and the intermediate terminal member 31.

In describing the operation of the fuse 18, it will first be assumed that it is subjected to an overload, such as that which might be caused by a partial failure of the insulation in one of the capacitors 17, so that only sufficient current flows to melt the fuse and support wires 29 and 30. Such a current would be insufficient to cause any marked change in the resistance characteristics of the conductor 34. Since the resistance of the fuse wire 29 formed of silver is considerably less than the resistance of the support wire 30, practically all of the current will flow therethrough, and, under the assumed conditions, it will be melted at the three places as indicated, and the current flow will be transferred to the support wire 30. Since its current carrying capacity is less than that of the fuse wire 29, it will immediately be melted, and three arcs will be formed at the sections 38. Three gaps are formed for the time being, bridged by metallic vapor and ionized gases which tend to form a conducting path for sustaining the arcs. When the current flow is as assumed, the arrival of the next zero point in the current wave marks the time when current no longer flows, since conditions will not be such as to permit the arc to be restruck during the next succeeding half cycle of the alternating current.

Experiments indicate that the three gaps in series are considerably more effective than a single gap for preventing reestablishment of the arc after it has once been extinguished. Since, in this case, three separate arcs are formed rather than a single arc as would be the case if the spacers 37 were not provided, the pressure created within the housing 19 is more uniformly distributed as has been set forth hereinbefore. It will, therefore, be clear that the provision of the spacers 37 permits the fuse to operate in a more satisfactory manner for interrupting the circuit and for preventing the restriking of the arc when the conductor 34 remains in its original condition.

The operation of the fuse 18 will now be described, based on the assumption that it is required to clear a fault of the type which might represent a complete failure of the insulation of one of the capacitors 17, thereby causing a direct short circuit between the conductors 15. The amount of short circuit current which flows will, of course, depend upon the impedance of the circuit to which the fuse 18 is connected. Under certain conditions, assuming a voltage from 2300 to 4000 volts, the short circuit current may be of a value of 20,000 amperes. It is under such conditions that the conductor 34 becomes effective.

Under these assumed conditions, due to the flow through the conductor 34 of relatively high current, a considerable amount of heat is generated therein which tends to drive off gases from the powder 35 that combine with the metal of the conductor 34 to form oxides of tungsten, or otherwise to change the conductor 34 to a substantially non-conductor, or, in other words, to change its characteristics so that in place of offering a relatively low resistance path to the flow of current therethrough, it offers a comparatively high resistance path comparable to that offered by an insulator. I am not able to state the exact chemical reaction which takes place, but I am able to state that the tungsten wire or wires of similar equivalent character are changed from the metallic form, in which they readily conduct current, to a chemical compound which is substantially non-conductive. This action occurs with extreme rapidity. In fact, the entire operation may occur within a quarter cycle of 60 cycle alternating current and, instead of the current rising, for example, to the assumed value of 20,000 amperes, it is estimated that it rises to less than 800 amperes. It will be understood, of course, that these figures are merely used for illustrative purposes, and that the values of current flowing may be different under different operating conditions.

In the course of this action, no flame or arc is emitted, and the operation of the fuse is noiseless. Such operation is particularly desirable where other apparatus might be affected due to the proximity of grounded structures or other phases of the distribution system.

The silver fuse wire 29 has peculiar utility in the present combination for the reason that silver does not tend to oxidize readily, even though raised nearly to its melting point, which is approximately 960° C. While the marble dust or powder 35, in which it is embedded, is rich in oxygen and decomposes at approximately 875° C., and the temperature of the silver fuse wire and the adjacent marble dust may rise to a fairly high value, without melting the fuse wire, the silver does not deteriorate in use, even though the fuse may be operating close to its blowing point for considerable periods of time. Hence, even if exposed to the marble dust or to atmosphere at a temperature close to the fusing point, the silver fuse wire does not appreciably change its time-current rating.

A fuse of this general type is not as well adapted for high ampere rating because of the difficulty in dissipating heat from the conducting parts. Hence it is desirable to maintain the resistance of this fuse device relatively low. The conductor 34 of tungsten or equivalent material, at normal load through the fuse 18, does not attain a temperature where chemical activity is initiated, even when standing under load over long periods of time. The operating temperature is so low that no detectable oxidation or other chemical change occurs in this conductor, and hence the device will not change its rating. In the specific form of fuse 18 illustrated in Figure 3 of the drawings for a rating of five amperes, the normal operating resistance of the entire assembly is approximately one-quarter of an ohm, divided approximately equally between the two elements for the 2300 volt application. After operation, however, of the fuse and support wires 29 and 30 and the series conductor 34, the resistance of the fuse 18 is raised to several megohms, and approximately ten times normal voltage will not cause a flash-over. The fuse operates with extreme rapidity during short circuit, and the possible current through it is definitely limited.

Under normal operating conditions of this fuse on a breakdown of a connected unit protected thereby, which subjects the fuse to a heavy current flow, the metal of the fuse and support wires 29 and 30 is practically all melted and is dissipated and absorbed in the body of the powder 35, producing a substantially complete gap at each of the sections 38. Also, the series conductor 34 of tungsten, molybdenum, tantalum, or the like, upon combining with the powder 35, leaves a residue which, itself, is a good insulator. Due to the high conductivity of the silver fuse wire 29, its cross-section is relatively small, and the amount of metal in the arc caused by its melting is relatively low. The series conductor 34 at current flow approximately at normal rating, or even at the current flow which is just sufficient to melt the fuse wire 29, is operating at a temperature considerably below the point at which any chemical activity will take place. It can be seen, therefore, that the fuse wire 29 gives the device a sharp time-current characteristic, while the chemical fuse element 34 and the associated powder 35, while incapable under the conditions stated of giving a sharp time-current response, nevertheless provides an extremely powerful current limiting effect due to its inherent change in resistance upon the rise of current flow therethrough to a value which is sufficient to initiate its operation.

In the manufacture of and in refilling the fuse 18, the element assembly comprising the fittings 28, the wires 29 and 30, and the conductor 34 connected thereto and to each other by the intermediate terminal member 31, constitutes a sub-assembly, or, in the case of refusing, constitutes a refill unit. In this combination, the support wire 30 is used principally to provide mechanical strength both for handling of the element assembly and for assembling the fuse and filling it with the powder 35.

Referring now particularly to Figures 6, 7 and 8 of the drawings, it will be observed that a modified form of fuse 45 is there illustrated. Since the housing 19 is formed of an opaque material, it is not possible to determine by a mere inspection of the fuse that it has operated. Therefore, it is desirable to provide some external means for giving an indication of the condition of the fuse and whether or not it has operated. For this purpose, the construction of the fuse 18 shown in Figures 2 and 3 of the drawings has been slightly modified at one end to provide the desired indicating feature.

As shown, a terminal member 46 is provided at the upper end of the housing 19, having a centrally located outwardly extending boss 47 which is interiorly threaded as at 48 for connection in the circuit, as described hereinbefore. Around the base of the boss 47, a circumferential groove 49 is provided in which an indicator ring 50 is disposed. When the ring 50 is in the position shown by the full lines, the fuse 45 is in the non-operated condition and is capable of conducting current therethrough under normal operating conditions. However, when the indicator ring 50 is moved to the position shown at 51 by the broken lines, this indicates that the fuse 45 has operated and that it must be replaced.

The indicator ring 50 is mounted on a U-shaped guide member 52, composed preferably of a conducting material such as phosphor bronze, the ends of which extend through suitable openings in the bottom of the groove 49 and which are secured to the indicator ring 50 as by riveting or peening or otherwise. The guide member 52 is mounted on a ring 53 which is provided with a pair of downwardly extending tongues 54 for centering a compression spring 55. The spring 55 is disposed between the ring 53 and an out-turned U-shaped bracket 56 which is secured to the upper end of the housing 19 by the screws 23 and 26 as illustrated. The bracket 56 is provided with a centrally located aperture 57 through which a strain wire 58 extends, being secured at its lower end to an intermediate terminal member 59 to which the conductor 34 is also connected. The intermediate terminal member 59 is mounted in a washer 60 at the lower end of a tube 61 formed of suitable insulating material. The upper end of the tube 61 is disposed in engagement with the under side of the bottom of the bracket 56. The tube 61, as well as the portion of the housing 19 around the conductor 34, is filled with the powder 35. In order to prevent the powder 35 from escaping from the upper end of the tube 61 a linen washer 62 is provided at its upper end. The bracket 56 is composed preferably of brass, and is electrically connected to the terminal member 46 by the screws 23 and 26 as will be readily understood. On the under side of the bracket 56 a terminal 63 is secured thereto in which a fuse wire 64, composed preferably of silver, may be connected, the other end of which may be connected to the intermediate terminal member 59 as illustrated.

In assembling the fuse 45, the strain wire 58 secured to the U-shaped guide member 52 is drawn downwardly to compress the spring 55, and it is secured in such position in the intermediate terminal member 59 that the indicator ring 50 carried by the guide member 52 will occupy the position shown by the full lines in the drawings. As soon as an overload condition occurs which is such as to cause the fuse wire 64 to be melted, the current flow is transferred to the strain wire 58 which is connected through the guide member 52 in parallel circuit relation therewith and it melts. The guide member 52 is then released for movement outwardly under the influence of the spring 55, and the indicator ring 50 is moved to the position shown by the broken lines.

Since the fuse 45 is preferably connected in the circuit by means of the centrally located boss 47, the provision of means for indicating the condition of the fuse which is movable longitudinally relatively thereto presented a problem, the solution of which was not readily apparent. By the provision of the indicator ring 50 around the base of the boss 47 under the biasing influence of the spring 55 as controlled by the strain wire 58, an indicator is provided which furnishes an indication that is at once apparent as to the condition of the fuse and, at the same time, permits electrical connection thereto in the desired manner.

Another form of indicator construction is shown in Figure 9 of the drawings. As there shown, the housing 19 is provided at one end with a cap 70, formed preferably of brass, and secured by means of the screws 23 to a cylindrical bushing 71 disposed inside of the housing 19 as illustrated. The cap 70 is provided with a centrally located threaded aperture 72 in which a terminal member 73 may be threadably mounted. The terminal member 73 is formed preferably of brass, and is provided with a threaded opening 74 at its outer end for connection in the circuit with which it is to be associated. As shown, the terminal member 73 is provided with a centrally located longitudinal slot 75 within which a transverse pin 76 is disposed to slide.

In order to provide an indication that the fuse has operated, an indicator disc 77 is provided around the terminal member 73 and on top of the cap 70 as illustrated. A compression coil spring 78 is provided in a suitable groove 79 formed in the upper face of the cap 70 for biasing the indicator disc 77 outwardly. The pin 76 extends through the slot 75 and into engagement with the upper surface of the indicator disc 77, the pin 76 having a length substantially equal to the outside diameter of the indicator disc 77, and it is secured in the position shown against the biasing force of the spring 78 by means of a strain wire 80. The strain wire 80 extends downwardly through a tube 81 of insulating material, and is secured to the lower end thereof by means of a terminal cap 82. The tube 81 may be lined with an arc extinguishing material 81a such as magnesium hydroxide or boric acid. The terminal cap 82 is pinched onto the lower end of the strain wire 80 and also onto the upper end of the refractory conductor 34 which is embedded in the powder 35 and functions in the manner set forth hereinbefore. The fuse wire 83, formed preferably of silver for the reasons set forth hereinbefore, is wound around the tube 81 and interconnected between the cap 70 and the terminal cap 82.

In assembling the indicator device illustrated in Figure 9, the strain wire 80 is passed downwardly through the tube 81 and is secured in the terminal cap 82 at such a position that the spring 78 will be compressed substantially to the position shown in the drawings. In this position the indicator disc 77 will be disposed in engagement with the upper end of the cap 70. On operation of the fuse, as by the melting of the fuse wire 83 and the strain wire 80, the spring 78 is released, since the pin 76 is no longer secured in the position shown in the drawings. The indicator disc 77 is then moved outwardly under the influence of the spring 78 until the pin 76 reaches the upper end of the slot 75. In this position a casual inspection will indicate to the operator that the fuse has operated and that it should be replaced.

With a view to providing a fuse which combines the features of the formation of a plurality of arcs in series and the variable resistance element with an indicator device for showing that the fuse has operated, the fuse shown generally at 85 in Figure 10 of the drawings may be used. As there shown, the housing 19 is provided with a terminal member 86 having the centrally located boss 87 interiorly threaded as at 88 for connection to the circuit as may be required. The flange portion of the terminal member 86 is provided with apertures 89 on opposite sides through which the upstanding ends of a U-shaped indicator guide 90 extend for carrying an indicator ring 91 which is normally disposed in a groove 92 in the terminal member 86. Mounted within the upper end of the housing 19 is a brass bushing 93 which is secured therein by means of the screws 23 and 26 as shown in Figures 11 and 12 of the drawings. The bushing 93 is provided with a centrally located upstanding portion 94 which is slotted to provide for the upward movement of the indicator guide 90. The opposite walls of the bushing 93 are slotted as at 95 in alignment with the openings 89 in the flange of the terminal member 86 for also permitting movement of the indicator guide 90. Around the central portion 94 and between the bottom of the bushing 93 and the under side of the indicator guide 90, a compression coil spring 96 is positioned for biasing the indicator guide outwardly. The bushing 93 is provided with a centrally located aperture 97 in its under surface in which a tube 98, preferably formed of insulating material such as glass or porcelain, may be positioned. A strain wire 99, secured to a connector 100 which is pierced by the indicator guide 90, extends downwardly through the tube 98 and a washer 101 positioned at its lower end where it is secured in an intermediate terminal member 102 having a transverse opening 103 for the spring spider 33 as described hereinbefore and shown more clearly in Figure 5 of the drawings.

In order to provide the desired time-current characteristics for the fuse 85, a fuse wire 104, preferably formed of silver, is connected to the bushing 93 by means of a terminal member 105, and at its lower end it is connected to the bottom of the intermediate terminal member 102. The intermediate terminal member 102 may be in the form of a soft brass tubing, the upper end of which may be readily pinched upon the lower end of the strain wire 99 while its lower end may be pinched on the fuse wire 104 and the upper end of the refractory conductor 34 as will be readily understood. The central part of the intermediate terminal member 102 may be pinched on the spring spider 33 for securing it in the position shown in the drawings. Spacers 106 are pinched on the fuse wire 104 at spaced positions intermediate the ends thereof to split up the arc formed on melting thereof into a plurality of arcs, in this case into three arcs. The spacers 106 are formed preferably of soft brass tubing which may be pinched onto the fuse wire 104. In Figure 10 of the drawings, the spacers 106 are illustrated as being pinched onto the fuse wire 104 in planes which are at right angles to each other.

The housing 19 is filled with the powder 35, as described hereinbefore. In order to prevent the powder which fills the tube 98 from escaping into the upper end of the fuse 85, a washer 107, formed preferably of cloth, is provided around the strain wire 99 as illustrated.

In assembling the fuse 85, the strain wire 99 is pulled downwardly through the tube 98 against the biasing force of the spring 96, and is secured in the intermediate terminal member 102 in such a position as will maintain the indicator guide 90 and the indicator ring 91 in the positions shown in Figure 10 of the drawings. The indicator guide 90 is formed preferably of a phosphor bronze wire, so that the strain wire 99 is effectively connected in parallel with the fuse wire 104. When the fuse wire 104 is melted due to an overload condition, the strain wire 99 is also melted, and the indicator guide 90 is released for upward movement under the influence of the spring 96. The indicator ring 91 is then moved upwardly to indicate that the fuse 85 has operated.

It will be observed that the fuse wire 104 is positioned without the tube 98, while the strain wire 99 is positioned within it. This construction is desirable rather than that disclosed in Figure 3 of the drawings where the fuse and strain wires are clamped together by the spacers which are provided for causing the plurality of arcs. When the indicator device is used, it is essential that there be no interference with the upward movement of the indicator guide 90 as might be the case if the spacers 106 were secured not only to the fuse wire 104 but also to the strain wire 99.

Since certain further changes may be made in the foregoing constructions, and different embodiments of the invention may be made without departing from the scope thereof, it is intended that all matter set forth in the foregoing description or shown in the accompanying drawings shall be interpreted as illustrative, and not in a limiting sense.

I claim as my invention:

1. In a fuse, a pair of spaced apart terminal members, a pair of current responsive elements interconnecting said terminal members, and means for connecting said elements in series circuit relation at a position intermediate said terminal members and substantially immovable relative thereto; the first of said elements comprising a conductor so proportioned as to melt on flow therethrough of a relatively low current to open the circuit between said terminal members; and the second of said elements comprising a conductor and an asociated reagent for reacting therewith to become substantially non-conductive on being heated to a temperature sufficient to initiate a reaction for increasing the resistance between said terminal members and preventing an arc from being sustained on flow of current greater than said relatively low current, said second element being so proportioned as not to be heated to said temperature on flow therethrough of said relatively low current.

2. In a fuse a fusible element disposed to melt and form an arc upon predetermined flow of current therethrough, means associated with said fusible element for sectionalizing said arc into a plurality of arcs in series circuit relation, and a chemical element disposed to be connected in series circuit relation with said arc and to offer a relatively low resistance path to flow of current therethrough below a predetermined value, the resistance of said chemical element being disposed to increase to a relatively high value on flow of current therethrough above said predetermined value for aiding said fusible element in interrupting the flow of current above said predetermined value.

3. In a fuse a pair of spaced apart terminal members, and a pair of current responsive circuit controlling elements inter-connecting said terminal members; the first of said elements comprising a conductor so proportioned as to melt on flow therethrough of a relatively low current to open the circuit between said terminal members, and means for sectionalizing the arc formed on melting of said conductor into a plurality of arcs in series; and the second of said elements comprising a conductor and an associated reagent for reacting therewith to become substantially non-conductive on being heated to a temperature sufficient to initiate a reaction for increasing the resistance between said terminal members and preventing said arcs from being sustained on flow of current greater than said relatively low current, said last named conductor being so proportioned as not to be heated to said temperature on flow therethrough of said relatively low current.

4. In a fuse a pair of spaced apart terminal members, a pair of current responsive circuit controlling elements interconnecting said terminal members, and means for connecting said elements in series circuit relation at a position intermediate said terminal members and substantially immovable relative thereto; the first of said elements comprising a conductor so proportioned as to melt on flow therethrough of a relatively low current to open the circuit between said terminal members, and means for sectionalizing the arc formed on melting of said conductor into a plurality of arcs in series; and the second of said elements comprising a conductor and an associated reagent for reacting therewith to become substantially non-conductive on being heated to a temperature sufficient to initiate a reaction for increasing the resistance of the conducting path between said terminal members and preventing said arcs from being sustained on flow of current greater than said relatively low current, said last named conductor being so proportioned as not to be heated to said temperature on flow therethrough of said relatively low current.

5. In a fuse a pair of spaced apart terminal members, a pair of current responsive circuit controlling elements inter-connecting said terminal members, and means for connecting said elements in series circuit relation at a position intermediate said terminal members and substantially immovable relative thereto; the first of said elements comprising a conductor so proportioned as to melt on flow therethrough of a relatively low current to open the circuit between said terminal members; a strain member disposed in parallel with said conductor for relieving it of mechanical stress, and means for sectionalizing the arc formed on melting of said conductor into a plurality of arcs in series; and the second of said elements comprising a conductor and an associated reagent for reacting therewith to become substantially non-conductive on being heated to a temperature sufficient to initiate a reaction for increasing the resistance of the conducting path between said terminal members and preventing said arcs from being sustained on flow of current greater than said relatively low current, said last named conductor being so proportioned as not to be heated to said temperature on flow therethrough of said relatively low current.

6. In a fuse a pair of spaced apart terminal members, and a pair of current responsive circuit controlling elements interconnecting said terminal members; the first of said elements comprising a conductor so proportioned as to melt on flow therethrough of a relatively low current to open the circuit between said terminal members, a metallic strain wire disposed in parallel with said conductor for relieving it of mechanical stress, and means for sectionalizing the arc formed on melting of said conductor into a plurality of arcs in series; and the second of said elements comprising a conductor and an associated reagent for reacting therewith to become substantially non-conductive on being heated to a temperature sufficient to initiate a reaction for increasing the resistance between said terminal members and preventing said arcs from being sustained on flow of current greater than said relatively low current, said last named conductor being so proportioned as not to be heated to said temperature on flow therethrough of said relatively low current.

7. In a device of the class described, a tubular fuse housing having terminals closing the ends, a silver fuse conductor and a tungsten conductor connected in series between said terminals, and a filling of comminuted limestone in the housing embedding both said conductors.

8. In a device of the class described, a closed tubular fuse housing having terminals at the ends thereof, a mass of a powdered compound substantially entirely filling said housing, a fusible wire, and a refractory metal wire mounted in fixed position in said housing and connected in series between said terminals, said compound upon being heated releasing a chemical reagent for attacking said refractory metal wire to reduce it to substantially a non-conductor.

9. In a device of the class described, a tubular fuse housing having terminals at its ends, a substantially straight fusible conductor in the housing connected to one terminal, a coiled refractory metal conductor connected to the other terminal, said conductors being joined within the housing, and a refractory powder substantially entirely filling said housing.

10. In a device of the class described, a tubular sleeve of insulation, metal terminals forming closures for the ends of the sleeve, a high conductivity wire and a low conductivity wire of high tensile strength connected in parallel between said terminals, and a cross-connecting conductor of a cross-section substantially in excess of said parallel conductors joining said parallel conductors intermediate their ends.

11. The combination of claim 10 wherein the cross-connecting conductor comprises a metal sleeve deformed upon said parallel conductors.

12. In a device of the class described, a tubular sleeve of insulation, a bracket fastened in the end of the sleeve, said bracket having a central opening, a tubular fitting having its outer end expanded about said opening, and a fuse conductor extending into said tubular fitting, the adjacent end of said tubular fitting being deformed upon said fusible conductor.

13. The combination of claim 12 with a cap extending over said end of the sleeve and being coupled to said bracket.

14. In a device of the class described, a tubular sleeve of insulation, a U-shaped bracket inserted into the open end of the sleeve and pinned to the wall thereof, said bracket having a central opening, a tubular fitting having one end expanded about said opening, a fuse conductor having its end gripped by the tubular fitting thereupon, and a caplike terminal extending over the end of the sleeve and electrically connected to said bracket.

15. An element for a fuse comprising a pair of parallel fuse conductors, tubular fittings deformed upon the ends of the parallel conductors, and an intermediate tubular conducting member deformed upon said parallel conductors intermediate their ends.

16. An element for a fuse comprising a pair of parallel fuse conductors, tubular fittings deformed upon the ends of the parallel conductors, a coil of refractory metal having one end embraced by one of said tubular fittings, and a third tubular fitting deformed upon the other end of the coil.

17. The combination of claim 16 with a tubular cross connector deformed upon said parallel conductors intermediate their ends.

18. The combination of claim 16 with a spider connected to the tubular fitting which joins said coil to said parallel conductor.

19. In a fuse device, a pair of current conducting elements, a tubular fitting having a transverse opening, and a resilient member extending through said opening, said tubular fitting at one end receiving one end of one of said elements and at the other end receiving one end of the other of said elements, said tubular fitting being deformed upon said elements and said resilient member.

20. In combination, a sleeve of insulation having U-shaped bracket members disposed in the ends thereof, tubular rivets extending endwise through said bracket members, a refractory metal coil having its outer end clamped by one of said tubular rivets, a fuse conductor having its outer end clamped by the other of said tubular rivets, a tubular clamping member for joining the inner ends of said coil and said conductor, a spider for spacing said tubular member from the walls of said sleeve, a relatively massive metallic member secured to said fuse conductor intermediate the ends thereof, a powder filling for said sleeve, and terminal caps embracing said ends of the sleeve and said bracket members.

21. In a fuse device, a fuse wire, a parallel strain wire, means cross-connecting said wires at their ends and intermediate their ends, a refractory metal conductor connected in series with said wires, and an oxygen-bearing compound associated with said refractory metal conductor.

22. In a fuse device, a silver fuse wire, a high tensile strength high resistance conductor in parallel with said wire, and a body of powdered calcium carbonate in contact with said wire and said conductor.

23. As an article of manufacture, a chemical fuse element and a multiple gap fuse element connected in series in a unitary structure.

24. An element for a fuse comprising a conductor of fusible metal, tubular fittings deformed on the ends of said conductor, a coil of refractory metal having one end embraced by one of said tubular fittings, and a third tubular fitting deformed upon the other end of said coil.

25. An element for a fuse comprising a conductor of fusible metal, tubular fittings deformed on the ends of said conductor, a tubular member deformed on said conductor intermediate the ends thereof, a coil of refractory metal having one end embraced by one of said tubular fittings, and a third tubular fitting deformed upon the other end of said coil.

26. An element for a fuse comprising a conductor of fusible metal, a relatively massive metallic member disposed in heat conducting relation to said conductor intermediate the ends thereof, and a coil of refractory metal connected in series circuit relation with said conductor.

27. An element for a fuse comprising a fuse wire, a plurality of relatively massive metallic members disposed in spaced apart heat conducting relation to said fuse wire intermediate the ends thereof, and a coil of refractory metal connected in series circuit relation with said fuse wire.

28. In an alternating current system of distribution of the class wherein a capacitor compensates for lagging power factor, the combination with said capacitor of a circuit control device connected in series circuit relation therewith comprising, a fusible element and a variable resistance element connected in series circuit relation, said fusible element being arranged and constructed to melt and open the circuit to said capacitor on the occurrence of a condition causing a relatively low excess current to flow thereto, and said variable resistance element being arranged and constructed to provide a relatively low resistance path for the flow of current to said capacitor below said relatively low excess current and to automatically provide a high resistance path for the flow of current above said relatively low excess current for assisting said fusible element in interrupting the circuit.

29. In an alternating current system of distribution of the class wherein a capacitor compensates for lagging power factor, the combination with said capacitor of a circuit control device connected in series circuit relation therewith comprising, a fusible element and a variable resistance element connected in series circuit relation, said fusible element being arranged and constructed to melt and open the circuit when the current flow exceeds the normal load current of said capacitor to a limited extent, and said variable resistance element being arranged and constructed to offer a relatively low resistance to the flow of said normal load current and of current to said limited extent and to be responsive to the heat generated therein by current flow in excess of said limited extent for automatically increasing the resistance thereof to prevent an arc being sustained on melting of said fusible element.

30. In an alternating current system of distribution of the class wherein a capacitor compensates for lagging power factor, the combination with said capacitor of a circuit control device connected in series circuit relation therewith comprising, a fusible member and a refractory metal member connected in series circuit relation, and a powdered compound surrounding said refractory metal member, said refractory metal member arranged and constructed to offer a relatively low resistance to the flow of normal load current of said capacitor and to the current flow in excess of said normal load current required to melt said fusible member, said compound upon being heated by current flow in excess of that required to melt said fusible member releasing a chemical reagent for reacting with said refractory metal member to increase the resistance thereof to a relatively high value, thereby preventing an arc being sustained on melting of said fusible element.

31. In an alternating current system of distribution of the class wherein a plurality of capacitors connected in parallel circuit relation compensate for lagging power factor, the combination with an over current protecting device connected in series circuit relation with each capacitor comprising, a fusible member and a refractory metal member connected in series circuit relation, and a powdered compound surrounding said refractory metal member, said refractory metal member being arranged and constructed to offer a relatively low resistance to the flow of normal load current of the capacitor individual thereto and to the current flow in excess of said normal load current required to melt said fusible member, said compound upon being heated by current flow in excess of that required to melt said fusible member releasing a chemical reagent for reacting with said refractory metal member to increase the resistance thereof to a relatively high value, thereby preventing an arc from bing sustained on melting of said fusible element.

32. In a fuse device, a sleeve of insulating material, a terminal member for covering one end of said sleeve, a boss extending outwardly from the center of said terminal, indicator means disposed to move longitudinally alongside said boss, resilient means for biasing said indicator means to a predetermined position, and a fusible element disposed to restrain said biasing means as long as it remains intact and to release said biasing means on being fused to move said indicator means for showing that the fuse device has operated.

33. In a fuse device, a sleeve of insulating material, a terminal member covering one end of said sleeve, a centrally located boss extending outwardly from said terminal member, an indicator ring surrounding the base of said boss, a guide member secured to said ring and movable longitudinally through said terminal member, a spring mounted inside of said sleeve for biasing said guide member and indicator ring outwardly, and fusible means disposed to hold said guide member against the biasing force of said spring while intact and to release it on being fused to permit said spring to move said ring outwardly to indicate that the fuse device has operated.

34. In a fuse device, a sleeve of insulating material, a terminal member covering one end of said sleeve, a centrally located boss extending outwardly from said terminal member, an indicator ring surrounding the base of said boss, a guide member secured to said ring and movable longitudinally through said terminal member, a spring mounted inside of said sleeve for biasing said guide member and indicator ring outwardly, a strain wire disposed to hold said guide member against the biasing force of said spring, and a fuse wire connected to said terminal member and in parallel with said strain wire, said fuse and strain wires being disposed to melt on passage therethrough of current above a predetermined value thereby releasing said guide member to move said ring outwardly under the influence of said spring to indicate that the fuse device has operated.

35. A fuse device comprising a sleeve of insulating material, a terminal member covering each end of said sleeve, a centrally located boss extending outwardly from each of said terminal members, an indicator ring surrounding the base of one of said bosses, a guide member secured to said ring and movable longitudinally through the terminal member individual thereto, a spring mounted inside of said sleeve for biasing said guide member and indicator ring outwardly, a strain wire disposed to hold said guide member against the biasing force of said spring, and a fuse wire connected between said terminal members and in parallel with said strain wire, said fuse and strain wires being disposed to melt on flow therethrough of current above a predetermined value thereby releasing said guide member to move said ring outwardly under the influence of said spring to indicate that the fuse device has operated.

36. A fuse device comprising a sleeve of insulating material, a terminal member covering each end of said sleeve, a centrally located boss extending outwardly from each of said terminal members, an indicator ring surrounding the base of one of said bosses, a guide member secured to said ring and movable longitudinally through the terminal member individual thereto, a spring mounted inside of said sleeve for biasing said guide member and indicator ring outwardly, a strain wire disposed to hold said guide member against the biasing force of said spring, a fuse wire connected in parallel with said strain wire, a coil of refractory metal connected in series with said strain and fuse wires, said series connected wires and coils being interconnected between said terminal members, said fuse and strain wires being disposed to melt on flow therethrough of current above a predetermined value thereby releasing said guide member to move said ring outwardly under the influence of said spring to indicate that the fuse device has operated.

37. A fuse device comprising a sleeve of insulating material, a terminal member covering each end of said sleeve, a centrally located boss extending outwardly from each of said terminal members, an indicator ring surrounding the base of one of said bosses, a guide member secured to said ring and movable longitudinally through the terminal member individual thereto, a spring mounted inside of said sleeve for biasing said guide member and indicator ring outwardly, a strain wire disposed to hold said guide member against the biasing force of said spring, a fuse wire connected in parallel with said strain wire, a coil of refractory metal connected in series with said strain and fuse wires, said series connected wires and coil being interconnected between said terminal members, and a filling of a powdered compound in said sleeve disposed upon being heated to release a chemical reagent for combining with said coil of refractory metal to change it to substantially a non-conductor, said fuse and strain wires being disposed to melt on flow therethrough of current above a predetermined value thereby releasing said guide member to move said ring outwardly under the influence of said spring to indicate that the fuse device has operated.

38. In a fuse device, a sleeve of insulating material, a cap carried by one end of said sleeve, a terminal member secured to said cap and extending outwardly thereof, said terminal member being provided with a transverse slot, a pin disposed to move in said slot, an indicator ring positioned around said terminal member between said pin and said cap, a compression spring interposed between said ring and said cap, and a fusible member disposed to hold said pin against the biasing force of said spring while intact and to release it on being fused to permit said spring to move said ring outwardly to indicate that the fuse device has operated.

39. In a fuse device, a tubular housing of insulating material, a cylindrical cap mounted at one end of said housing, a cylindrical terminal member of less diameter than said cap, one end of said terminal member being threaded into said cap and the other end being interiorly threaded, a transverse slot in said terminal member, a pin disposed to move in said slot, an indicator ring positioned around said terminal member between said pin and said cap, a compression spring interposed between said ring and said cap, a tube of insulating material coaxial with said terminal member inside said housing, a terminal cap covering the inner end of said insulating tube, a strain wire secured between said pin and said terminal cap for holding said ring against the biasing force of said spring, and a fuse wire connected in parallel with said strain wire, said fuse and strain wires being disposed to melt on flow therethrough of current above a predetermined value thereby releasing said pin and permitting said spring to move said ring outwardly to indicate that the fuse device has operated.

40. In a fuse device, a tubular housing of insulating material, a cylindrical cap mounted at one end of said housing, a cylindrical terminal member of less diameter than said cap, one end of said terminal member being threaded into said cap and the other end being interiorly threaded, a transverse slot in said terminal member, a pin disposed to move in said slot, an indicator ring positioned around said terminal member between said pin and said cap, a compression spring interposed between said ring and said cap, a tube of insulating material coaxial with said terminal member inside said housing, a terminal cap covering the inner end of said insulating tube, a strain wire secured between said pin and said terminal cap for holding said ring against the biasing force of said spring, a fuse wire connected in parallel with said strain wire and to said terminal cap, a coil of refractory metal connected to said terminal cap, and a filling of a powdered compound in said housing disposed upon being heated to release a chemical reagent for combining with said coil of refractory metal to change it to substantially a non-conductor, said fuse and strain wires being disposed to melt on flow therethrough of current above a predetermined value thereby releasing said pin and permitting said spring to move said ring outwardly to indicate that the fuse device has operated.

41. In a fuse a pair of spaced apart terminal members, a pair of current responsive circuit controlling elements interconnecting said terminal members, means for connecting said elements in series circuit relation at a position intermediate said terminal members and substantially immovable relative thereto; the first of said elements comprising a conductor so proportioned as to melt on flow therethrough of a relatively low current to open the circuit between said terminal members; and the second of said elements comprising a conductor and an associated reagent for reacting therewith to become substantially non-conductive on being heated to a temperature sufficient to initiate a reaction for increasing the resistance between said terminal members and preventing an arc from being sustained on flow of current greater than said relatively low current, said second element being so proportioned as not to be heated to said temperature on flow therethrough of said relatively low current, and means for indicating that said first element has operated.

42. In a fuse a fusible element disposed to melt and form an arc upon a predetermined flow of current therethrough, means associated with said fusible element for sectionalizing said arc into a plurality of arcs in series circuit relation, a chemical element disposed to be connected in series circuit relation with said arc and to offer a relatively low resistance path to flow of current therethrough below a predetermined value, the resistance of said chemical element being disposed to increase to a relatively high value on flow of current therethrough above said predetermined value for aiding said fusible element in interrupting the flow of current above said predetermined value, and indicator means movable externally of the fuse for indicating that said fusible element has melted.

43. In a fuse a pair of spaced apart terminal members, a pair of current responsive circuit controlling elements interconnecting said terminal members; the first of said elements comprising a conductor so proportioned as to melt on flow therethrough of a relatively low current to open the circuit between said terminal members, and means for sectionalizing the arc formed on melting of said conductor into a plurality of arcs in series; and the second of said elements comprising a conductor and an associated reagent for reacting therewith to become substantially non-conductive on being heated to a temperature sufficient to initiate a reaction for increasing the resistance between said terminal members and preventing said arcs from being sustained on flow of current greater than said relatively low current, said last named conductor being so proportioned as not to be heated to said temperature on flow therethrough of said relatively low current, an indicator movable externally of the fuse, resilient means for biasing said indicator, means for restraining said resilient means, and means responsive to the operation of said first element for cooperating with said restraining means to release said resilient means for moving said indicator to a position indicating that the fuse has operated.

44. In a fuse, a terminal member, indicator means movable through said terminal member, resilient means for biasing said indicator means outwardly, a tubular member extending inwardly from said terminal member, an intermediate terminal member disposed at the inner end of said tubular member, a strain wire interconnecting said indicator means and said intermediate terminal member for holding said indicator means against the biasing force of said resilient means, and a fuse wire interconnecting said terminal members, said fuse and strain wires being disposed to melt on flow therethrough of current above a predetermined value thereby releasing said indicator means for movement under the influence of said resilient means to indicate that the fuse has operated.

45. In a fuse, a terminal member, indicator means movable through said terminal member, a spring for biasing said indicator means outwardly, a tubular member of insulating material extending inwardly from said terminal member, an intermediate terminal member disposed at the inner end of said tubular member, a strain wire disposed within said tubular member and interconnecting said indicator means and said intermediate terminal member for holding said indicator means against the biasing force of said spring, and a fuse wire disposed without said tubular member and interconnecting said terminal members, said fuse and strain wires being disposed to melt on flow therethrough of current above a predetermined value thereby releasing said indicator means for movement under the influence of said resilient means to indicate that the fuse has operated.

46. In a fuse, a terminal member, indicator means movable through said terminal member, a spring for biasing said indicator means outwardly, a tubular member of insulating material extending inwardly from said terminal member, an intermediate terminal member disposed at the inner end of said tubular member, a strain wire disposed within said tubular member and interconnecting said indicator means and said intermediate terminal member for holding said indicator means against the biasing force of said spring, a fuse wire disposed without said tubular member and interconnecting said terminal members, and a relatively massive metallic member disposed in heat conducting relation to said fuse wire intermediate the ends thereof, said fuse and strain wires being disposed to melt on flow therethrough of current above a predetermined value forming a plurality of arcs between said terminal members and said relatively massive metallic member and releasing said indicator means for movement under the influence of said spring to indicate that the fuse has operated.

47. In a fuse, a terminal member, indicator means movable through said terminal member, a spring for biasing said indicator means outwardly, a tubular member of insulating material extending inwardly from said terminal member, an intermediate terminal member disposed at the inner end of said tubular member, a strain wire disposed within said tubular member and interconnectig said indicator means and said intermediate terminal member for holding said indicator means against the biasing force of said spring, a fuse wire disposed without said tubular member and interconnecting said terminal members, a refractory metal member connected to said intermediate terminal member, and a powdered compound surrounding said refractory metal member, said fuse and strain wires being disposed to melt on flow therethrough of current above a predetermined value forming an arc between said terminal members and releasing said indicator means for movement under the influence of said spring to indicate that the fuse has operated, said refractory metal member arranged and constructed to offer a relatively low resistance to the flow of normal load current and to the current flow in excess thereof required to melt said fuse and strain wires, said compound upon being heated by current flow in excess of that required to melt said strain and fuse wires releasing a chemical reagent for reacting with said refractory metal member to increase the resistance thereof to a relatively high value, thereby preventing said arc being sustained.

48. In a fuse, a terminal member, indicator means movable through said terminal member, a spring for biasing said indicator means outwardly, a tubular member of insulating material extending inwardly from said terminal member, an intermediate terminal member disposed at the inner end of said tubular member, a strain wire disposed within said tubular member and interconnectig said indicator means and said intermediate terminal member for holding said indicator means against the biasing force of said spring, a fuse wire disposed without said tubular member and interconnecting said terminal members, a relatively massive metallic member disposed in heat conducting relation to said fuse wire intermediate the ends thereof, a coil of refractory metal connected to said intermediate terminal member, and a mass of comminuted limestone surrounding said coil, said fuse and strain wires being disposed to melt on flow therethrough of current above a predetermined value forming a plurality of arcs between said massive metallic member and said terminal members and releasing said indicator means for movement under the influence of said spring to indicate that the fuse has operated, said coil arranged and constructed to offer a relatively low resistance to the flow of normal load current and to the current in excess thereof required to melt said fuse and strain wires, said limestone upon being heated by current flow in excess of that required to melt said strain and fuse wires releasing a chemical reagent for reacting with said coil to increase the resistance thereof to a relatively high value, thereby preventing said arcs being sustained.

49. An element for a fuse comprising a metallic bushing disposed to be secured at one end of a fuse housing, an outwardly extending hollow boss integrally formed with said bushing, a U-shaped indicator member slidably mounted in said bushing and disposed to extend outwardly of said fuse housing, a compression coil spring positioned around said boss and disposed to bias said indicator member outwardly, a tubular member positioned in said hollow boss, a terminal member at the inner end of said tubular member, a strain wire interconnecting said indicator and terminal members for holding the former against the biasing force of said spring, and a fuse wire interconnecting said bushing and said terminal member.

50. An element for a fuse comprising a metallic bushing disposed to be secured at one end of a fuse housing, an outwardly extending hollow boss integrally formed with said bushing, a U-shaped indicator member slidably mounted in said bushing and disposed to extend outwardly of said fuse housing, a compression coil spring positioned around said boss and disposed to bias said indicator member outwardly, a tubular member positioned in said hollow boss, a terminal member at the inner end of said tubular member, a strain wire interconnecting said indicator and terminal members for holding the former against the biasing force of said spring, a fuse wire interconnecting said bushing and said terminal member, and a refractory metal member having one end connected to said terminal member.

51. An element for a fuse comprising a metallic bushing disposed to be secured at one end of a fuse housing, an outwardly extending hollow boss integrally formed with said bushing, a U-shaped indicator member slidably mounted in said bushing and disposed to extend outwardly of said fuse housing, a compression coil spring positioned around said boss and disposed to bias said indicator member outwardly, a tubular member of insulating material positioned in said hollow boss, a terminal member at the inner end of said tubular member, a strain wire disposed within said tubular member and interconnecting said indicator and terminal members for holding the former against the biasing force of said spring, and a fuse wire disposed without said tubular member and interconnecting said bushing and said terminal member.

52. An element for a fuse comprising a metallic bushing disposed to be secured at one end of a fuse housing, an outwardly extending hollow boss integrally formed with said bushing, a U-shaped indicator member slidably mounted in said bushing and disposed to extend outwardly of said fuse housing, a compression coil spring positioned around said boss and disposed to bias said indicator member outwardly, a tubular member of insulating material positioned in said hollow boss, a terminal member at the inner end of said tubular member, a strain wire disposed within said tubular member and interconnecting said indicator and terminal members for holding the former against the biasing force of said spring, a fuse wire disposed without said tubular member and interconnecting said bushing and said terminal member, and a coil of refractory metal having one end connected to said terminal member.

53. In a fuse, a pair of spaced apart terminal members, a pair of current responsive elements interconnecting said terminal members, means for connecting said elements in series circuit relation at a position intermediate said terminal members and substantially immovable relative thereto; the first of said elements comprising a conductor so proportioned as to melt on flow therethrough of a relatively low current to open the circuit between said terminal members; and the second of said elements comprising a conductor and an associated reagent for reacting therewith to become substantially non-conductive on being heated to a temperature sufficient to initiate a reaction for increasing the resistance between said terminal members and preventing an arc from being sustained on flow of current greater than said relatively low current, said second element being so proportioned as not to be heated to said temperature on flow therethrough of said relatively low current, and externally movable indicator means disposed to be responsive to the operation of one of said current responsive elements for moving from one position to another to indicate that the fuse has operated.

54. In a fuse a fusible element disposed to melt and form an arc upon a predetermined flow of current therethrough, means associated with said fusible element for sectionalizing said arc into a plurality of arcs in series circuit relation, a chemical element disposed to be connected in series circuit relation with said arc and to offer a relatively low resistance path to flow of current therethrough below a predetermined value, the resistance of said chemical element being disposed to increase to a relatively high value on flow of current therethrough above said predetermined value for aiding said fusible element in interrupting the flow of current above said predetermined value, and externally movable indicator means disposed to be responsive to the operation of said fusible element for moving from one position to another to indicate that the fuse has operated.

55. An element for a fuse comprising a metallic bushing disposed to be secured at one end of a fuse housing, an outwardly extending hollow boss integrally formed with said bushing, a U-shaped indicator member slidably mounted in said bushing and disposed to extend outwardly of said fuse housing, a compression coil spring positioned around said boss and disposed to bias said indicator member outwardly, a tubular member of insulating material positioned in said hollow boss, a terminal member at the inner end of said tubular member, a strain wire disposed within said tubular member and interconnecting said indicator and terminal members for holding the former against the biasing force of said spring, a fuse wire disposed without said tubular member and interconnecting said bushing and said terminal member, and a relatively massive metallic member disposed in heat conducting relation to said fuse wire intermediate the ends thereof.

56. An element for a fuse comprising a metallic bushing disposed to be secured at one end of a fuse housing, an outwardly extending hollow boss integrally formed with said bushing, a U-shaped indicator member slidably mounted in said bushing and disposed to extend outwardly of said fuse housing, a compression coil spring positioned around said boss and disposed to bias said indicator member outwardly, a tubular member of insulating material positioned in said hollow boss, a terminal member at the inner end of said tubular member, a strain wire disposed within said tubular member and interconnecting said indicator and terminal members for holding the former against the biasing force of said spring, a fuse wire disposed without said tubular member and interconnecting said bushing and said terminal member, a relatively massive metallic member disposed in heat conducting relation to said fuse wire intermediate the ends thereof, and a coil of refractory metal having one end connected to said terminal member.

57. In a fuse device, in combination, a casing of insulating material, terminals at the ends of said casing, a cylindrical boss extending axially outwardly of each terminal for connecting the same to terminal clips, an indicator movable coaxially and telescopically with respect to one boss, resilient means biasing said indicator, and conductor means extending through said casing and interconnecting said terminals and including a fusible section connected to said indicator for restraining movement of the same under the influence of said biasing means.

58. In a fuse, a casing, a terminal member at one end of said casing, an indicator movable from non-indicating to indicating position, resilient means biasing said indicator to indicating position, a tubular member within said casing extending inward from said terminal member, a strain wire in said tubular member connected to said indicator at one end and anchored to said tubular member at the other end whereby said indicator is prevented from movement to indicating position, and a fuse wire in said tubular member connected to said terminal member and paralleling said strain wire, said strain and fuse wires being disposed to melt on the occurrence of a fault and release said indicator for movement by said resilient means to indicate that the fuse has operated.

59. In a fuse, an insulating casing, terminals at the ends of said casing, an indicator movable from non-indicating to indicating position, resilient means biasing said indicator to indicating position, a tubular insulating member within said casing, a strain wire within said tubular member connected to said indicator at one end and anchored to said tubular member at the other end whereby said indicator is held in the non-indicating position, a conductor within said casing interconnecting said terminals, a portion of said conductor being positioned within said tubular member and paralleling said strain wire, the portion of said conductor within said tubular member and said strain wire blowing when subjected to rated current and releasing said indicator for movement to said indicating position, and a filling of material in powder form embedding said strain wire, and conductor and assisting in extinguishing arcs formed within said casing.

60. In a fuse, an insulating casing, terminals at the ends of said casing, an indicator movable from non-indicating to indicating position, resilient means biasing said indicator to indicating position, a tubular insulating member within said casing, a strain wire within said tubular member connected to said indicator at one end and anchored to said tubular member at the other end whereby said indicator is held in the non-indicating position, a conductor within said casing interconnecting said terminals, a portion of said conductor being positioned within said tubular member and paralleling said strain wire, the portion of said conductor within said tubular member and said strain wire always operating first whether subject to rated overload current or to relatively heavy overload current and releasing said indicator for movement to said indicating position, the portion of said conductor without said tubular member operating only when subjected to current flow greater than the rated overload current required to operate said first mentioned portion, and a filling of powdered material embedding said strain wire and conductor and assisting in extinguishing arcs formed within said casing.

61. In a fuse, an insulating casing, terminals at the ends of said casing, an indicator movable from non-indicating to indicating position, resilient means biasing said indicator to indicating position, a tubular insulating member within said casing, a strain wire within said tubular member connected to said indicator at one end and anchored to said tubular member at the other end whereby said indicator is held in the non-indicating position, a conductor within said casing interconnecting said terminals, a portion of said conductor being positioned within said tubular member and paralleling said strain wire, the portion of said conductor within said tubular member and said strain wire always operating first whether subjected to rated overload current or to relatively heavy overload current and releasing said indicator for movement to said indicating position, the portion of said conductor without said tubular member operating only when subjected to current flow greater than the rated overload current required to operate said first mentioned portion, and having a length substantially greater than the longitudinal dimension of the space occupied thereby within said casing, and a filling of powdered material embedding said strain wire and conductor and assisting in extinguishing arcs formed within said casing.

62. In a fuse, a terminal member, indicator means movable from non-indicating to indicating position, a spring for biasing said indicator means outwardly, a tubular member of insulating material extending inwardly from said terminal member, an intermediate terminal member disposed at the inner end of said tubular member, fusible means within said tubular member interconnecting said indicator means and said intermediate terminal for holding the former against the biasing force of said spring, a refractory metal member connected to said intermediate terminal member, and a powdered compound surrounding said refractory metal member, said fusible means being disposed to melt on flow therethrough of current above a predetermined value forming an arc between said terminal members and releasing said indicator means for movement under the influence of said spring to indicate that the fuse has operated, said refractory metal member arranged and constructed to offer a relatively low resistance to the flow of normal load current and to the current flow in excess thereof required to melt said fusible means, said compound upon being heated by current flow in excess of that required to melt said fusible means releasing a chemical reagent for reacting with said refractory metal member to increase the resistance thereof to a relatively high value, thereby preventing said arc being sustained.

63. In a fuse device, in combination, a tubular casing of insulating material, terminals at the ends of said casing, indicator means movable from non-indicating to indicating position, conductor means within said casing interconnecting said terminals and having one portion that always operates first and another portion that operates following the operation of said one portion, a filling of powdered inorganic insulating material embedding said other portion of said conductor and adapted to assist in extinguishing the arc formed on operation of the same, and means responsive to current flow between said terminals on operation of said conductor means for effecting the operation of said indicating means to the indicating position.

64. In a fuse device, in combination, a tubular casing of insulating material, terminals at the ends of said casing, indicator means movable from non-indicating to indicating position, conductor means within said casing interconnecting said terminals and having one portion that always operates first and another portion that operates following the operation of said one portion, a filling of powdered inorganic insulating material embedding said other portion of said conductor and adapted to assist in extinguishing the arc formed on operation of the same, means biasing said indicator means to the indicating position, and a strain element paralleling said one portion and connected to said indicator means at one end and anchored at a point within said casing at the other end and operating on operation of said one portion of said conductor means thereby releasing said indicating means for movement to the indicating position.

65. In a fuse device in combination, a tubular casing of insulating material, terminals at the ends of said casing, indicator means movable from non-indicating to indicating position, conductor means within said casing interconnecting said terminals and having one portion that always operates first and another portion that operates following the operation of said one portion, a body of solid arc extinguishing material surrounding said one portion of said conductor and adapted to evolve an arc extinguishing medium due to the heat of the arc formed on operation of said one portion for assisting in extinguishing the same, a body of relatively inert material surrounding said other portion of said conductor and adapted to assist in extinguishing the arc formed on operation of the same, and means for effecting the operation of said indicating means to the indicating position on operation of said one portion of said conductor.

66. In a fuse device, in combination, an insulating casing, terminals at the ends of said casing, conductor means within said casing interconnecting said terminals and having one portion that always operates first and another portion that operates following the operation of said one portion and has a length substantially greater than the longitudinal dimension of the space occupied thereby within said casing, and a filling of powdered material embedding said conductor means and adapted to assist in extinguishing arcs formed within said casing.

67. In a fuse device, in combination, an insulating casing, terminals at the ends of said casing, conductor means within said casing interconnecting said terminals and having one portion that always operates first and another portion that operates following the operation of said one portion and has a length substantially greater than the longitudinal dimension of the space occupied thereby within said casing, a filling of powdered material embedding said conductor means and adapted to assist in extinguishing arcs formed within said casing, an indicator movable from non-indicating to indicating position, means biasing said indicator to indicating position, and a strain element paralleling said one portion of said conductor and anchored at a point between said terminals within said casing and connected to said indicator for restraining the same until said one portion of said conductor operates.

68. In a fuse device, in combination, an insulating casing, terminals at the ends of said casing, conductor means within said casing interconnecting said terminals and having one portion that always operates first and another portion that operates following the operation of said one portion and has a length substantially greater than the longitudinal dimension of the space occupied thereby within said casing, a filling of powdered material embedding said conductor means and adapted to assist in extinguishing arcs formed within said casing, and means including a conductor shunted around said one portion and adapted to provide an indication that the fuse device has operated on operation of said one portion.

69. In a fuse device, in combination, an insulating casing, terminals at the ends of said casing, conductor means within said casing interconnecting said terminals and having one portion that always operates first and another portion that operates following the operation of said one portion and has a length substantially greater than the longitudinal dimension of the space occupied thereby within said casing, a filling of powdered material embedding said conductor means and adapted to assist in extinguishing arcs formed within said casing, a conductor providing a shunt path around said one portion, and means responsive to current flow along said shunt path on operation of said one portion for indicating that the fuse device has operated.

70. In a fuse device, in combination, a tubular casing of insulating material, terminals at the ends of said casing, conductor means within said casing interconnecting said terminals and having one portion that always operates first and another portion that operates following the operation of said one portion, arc extinguishing material surrounding said one portion of said conductor and adapted to evolve an arc extinguishing medium due to the heat of the arc formed on operation of said one portion for assisting in extinguishing the same, and a mass of finely divided relatively inert material surrounding said other portion of said conductor and adapted to assist in extinguishing the arc formed on operation of the same.

71. In a fuse device, in combination, a tubular casing of insulating material, terminals at the ends of said casing, conductor means within said casing interconnecting said terminals and having one portion that always operates first and another portion that operates following the operation of said one portion, arc extinguishing material surrounding said one portion of said conductor and adapted to evolve an arc extinguishing medium due to the heat of the arc formed on operation of said one portion for assisting in extinguishing the same, and a mass of finely divided relatively inert material embedding said other portion of said conductor and adapted to assist in extinguishing the arc formed on blowing of the same, the length of said other portion of said conductor being substantially greater than the distance between its ends within said casing.

72. In a fuse device, in combination, a tubular casing of insulating material, terminals at the ends of said casing, conductor means within said casing interconnecting said terminals and having one portion that always operates first and another portion that operates following the operation of said one portion, arc extinguishing material surrounding said one portion of said conductor and adapted to evolve an arc extinguishing medium due to the heat of the arc formed on operation of said one portion for assisting in extinguishing the same, means for rapidly lengthening the arc formed on operation of said one portion of said conductor, and a mass of finely divided relatively inert material surrounding said other portion of said conductor and adapted to assist in extinguishing the arc formed on operation of the same.

73. In a fuse device, in combination, a tubular casing of insulating material, terminals at the ends of said casing, conductor means within said casing interconnecting said terminals and having one portion that always operates first and another portion that operates following the operation of said one portion, arc extinguishing material surrounding said one portion of said conductor and adapted to evolve an arc extinguishing medium due to the heat of the arc formed on operation of said one portion for assisting in extinguishing the same, means biasing the ends of said one portion of said conductor apart to lengthen the arc formed on operation of the same, and a mass of finely divided relatively inert material embedding said other portion of said conductor and adapted to assist in extinguishing the arc formed on operation of the same, the length of said other portion of said conductor being substantially greater than the distance between its ends within said casing.

74. In a fuse device having a tubular insulating casing with terminals at its ends, in combination, first and second conductor means connected in series circuit relation within said housing for interconnecting said terminals, said first conductor means being arranged and adapted to operate before said second conductor means, dry arc extinguishing material surrounding said first conductor means and adapted to evolve an arc extinguishing medium due to the heat of the arc formed on operation of said first conductor means for extinguishing the same, and a mass of finely divided relatively inert dry material surrounding said second conductor means and cooperating with the same to provide a high resistance path to the flow of current through said first conductor means to limit the energy released on operation thereof.

75. In a fuse device having a tubular insulating casing with terminals at its ends, in combination, first and second conductor means connected in series circuit relation within said housing for interconnecting said terminals, said first conductor means being arranged and adapted to operate before said second conductor means, dry arc extinguishing material surrounding said first conductor means and adapted to evolve an arc extinguishing medium due to the heat of the arc formed on operation of said first conductor means for extinguishing the same, means for rapidly lengthening the arc formed on operation of said first conductor means, and a mass of finely divided relatively inert dry material surrounding said second conductor means and cooperating with the same to provide a high resistance path to the flow of current through said first conductor means to limit the energy released on operation thereof.

HUGH A. TRIPLETT.